United States Patent Office 2,708,674
Patented May 17, 1955

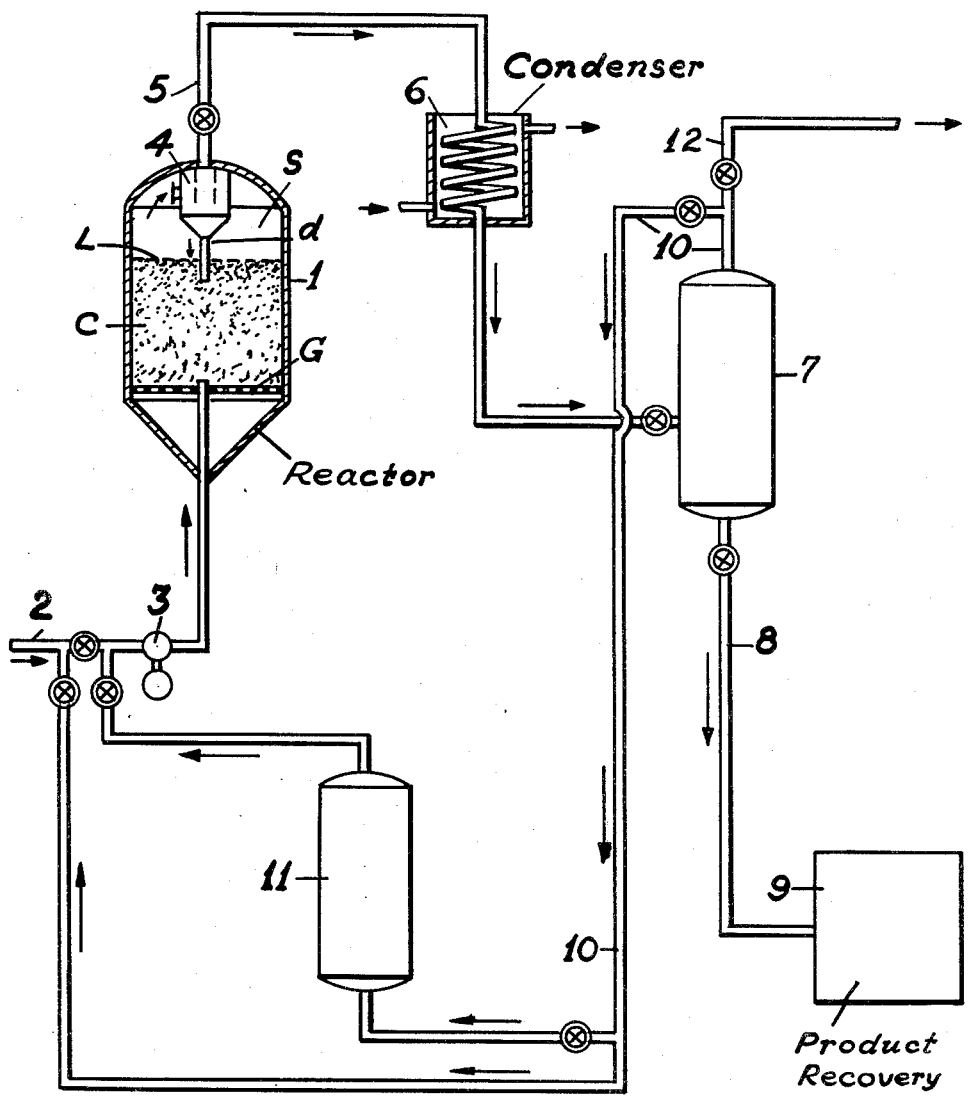

2,708,674

PROCESS FOR THE SYNTHESIS OF HYDROCARBONS EMPLOYING A HYDROGEN-SINTERED PYRITES ASH

William J. Mattox and Fred J. Buchmann, Baton Rouge, La., assignors to Esso Research and Engineering Company, a corporation of Delaware Application February 1, 1952, Serial No. 269,494

4 Claims. (Cl. 260—449.6)

This application is a continuation-in-part of our application Serial No. 66,108 filed December 18, 1948, now abandoned.

Our present invention relates to improvements in the reduction of the oxides of carbon to produce relatively high molecular weight hydrocarbons in the presence of a powdered iron catalyst which is maintained in the form of a fluidized bed in a reaction zone. In particular our invention relates to the preparation of an improved catalyst to be used in the hydrocarbon synthesis process. This improved catalyst has excellent resistance to carbon formation and disintegration and at the same time the activity and selectivity are maintained at the desired levels.

Heretofore and prior to our invention it was known that iron, particularly iron promoted with minor amounts of certain alkali metal compounds such as potassium fluoride, potassium carbonate, potassium or sodium acetate and numerous others, provided an active catalyst in the synthesis of hydrocarbons and oxidized hydrocarbons, from a synthesis feed gas containing carbon monoxide and hydrogen. It has also been disclosed in the literature that this type of operation may be carried out employing the so-called fluidized catalyst technique, a procedure in which the iron in powdered form is suspended in the gasiform reactants in a reaction zone to form a dense, turbulent, ebullient suspension of catalyst in said gasiform material.

However, our researches have demonstrated that when the hydrocarbon synthesis operation is conducted in the presence of an iron catalyst, the catalyst becomes contaminated with carbonaceous deposits as synthesis proceeds particularly when high activity and high liquid yields are obtained. Subsequently, the catalyst tends to undergo fragmentation or physical disintegration to the extent that an inordinately large proportion of fines (0–20 micron size material) is formed. When the fluidized mass or bed of catalyst contains a large quantity of fines it becomes difficult, if not impossible, to maintain the powdered iron catalyst in a well-fluidized state. Since in the ordinary fluidized catalyst operation an attribute of such process is that a separation is effected, in the reactor, of the main bulk of the catalyst from the gasiform reactants and products, and further since, when the catalyst contains an excessive quantity of fines, such separation is not possible, or is difficult, then obviously it is desirable to prevent fragmentation of the catalyst, for the fines thus produced tend to pass out of the reactor with the gaseous products, rather than to remain in the said reactor. Furthermore, the presence of fines in excessive quantities in the fluidized bed of catalyst impairs the uniformity of mixing of the catalyst, which is a characteristic advantage of a well fluidized bed of catalyst. As a result of this impaired or poor mixing of the catalyst, it is difficult, if not impossible, to maintain a substantially uniform temperature throughout the bed of catalyst and there is a tendency to develop localized "hot spots" in the catalyst bed, and the fluidization will be otherwise unsatisfactory.

An object, and a very important one, of our invention resides in the concept of subjecting an iron catalyst derived from pyrites ash to sintering in an atmosphere of hydrogen and also increasing the amount of promoter in the catalyst so that we finally obtain a catalyst which has good resistance to fragmentation and/or physical disintegration but which at the same time possesses high activity and selectivity.

Another object of the invention is to prepare an iron catalyst of good activity and selectivity and also possessing high mechanical strength, and therefore, good resistance against fragmentation when used in the form of a fluidized bed from a cheap source, namely, pyrites ash.

Other and further objects of our invention will appear in the following more detailed description and claims.

In the accompanying drawing, we have shown diagrammatically an equipment layout in which a modification of our invention may be carried into effect.

Referring in detail to the drawing, 1 represents a reactor which is in the form of a cylinder having a conical base and a convex crown. The reactor has disposed in the lower portion thereof a screen or grid G. The reactor contains a body or bed of powdered fluidized catalyst C. The catalyst which has a particle size of from 0–200 microns with less than about 20% 0–20 microns, 10–30% having a particle size of from 40–80 microns and the rest having a particle size of from 20–40 and 80–200 microns, is formed into a dense turbulent, fluidized bed of catalyst, in gasiform material which is charged to the reactor as will presently appear. The synthesis gas containing carbon monoxide and hydrogen, properly proportioned, enters the system through line 2 and is then forced by a pump 3 into the bottom of the reactor 1 and thereafter through the foraminous member G into the massed catalyst. By controlling the superficial velocity of the gasiform material flowing upwardly into the reactor within the limits from about ½ to 1½ ft./sec., the said fluidized bed of catalyst is formed. By superficial velocity we refer to that velocity the gasiform material would have with no catalyst in the reactor. Depending upon the actual mass or weight of catalyst in the reactor, and under the conditions of gas velocity and particle size which we previously mentioned, the fluidized mass of catalyst will have an upper dense phase level at L which is some distance below the top of the reactor. In the space S between L and the top of the reactor, there is a dilute suspension of catalyst in gasiform material and the said space S serves as a disengaging zone permitting separation of catalyst from gases and vapors about to leave the reactor. However, it is usually desirable to dispose a plurality of centrifugal separators 4 (one shown), in the upper portion of the reactor and to force the gas and vapors about to leave the reactor through the centrifugal separators for the purpose of separating catalyst still entrained in the exiting gases, and to return the thus separated catalyst to the dense phase through dip pipes (one shown).

The feed gas contacts the catalyst in the reactor under synthesizing conditions of temperature, pressure, and contact time, all of which will be more fully explained hereinafter, and then the gasiform product emerges from the dense phase, passes through the dilute phase and the "cyclones," if any, disposed in the top of the reactor and eventually are withdrawn through line 5. The gasiform material in line 5 is then discharged into a cooler 6 where it is cooled sufficiently to condense the normally liquid hydrocarbons, oxygenated hydrocarbons, and water contained in said gasiform material. A satisfactory temperature to which the product could be cooled is, say, about 100° F. The cooled product is then discharged into a separation tank 7 from which the condensate may be withdrawn through line 8 and delivered to recovery system 9. It has not been illustrated in the drawing nor shall it be described in words the method of recovering the gasoline, gas oil, and the various oxygenated compounds for one skilled in this art will be familiar with the conventional procedures which would be involved to accomplish the recovery of the desired products in the purified form.

Referring to the separation tank 7 gasiform material may be withdrawn through a line 10 and recycled to line 2 for further processing. However, it is usually advisable to scrub out of the gasiform material in line 10 at least a portion of its $CO_2$ content and to this end, therefore, the gas may be forced through a $CO_2$ scrubber 11 containing, for example, an aqueous solution of ethanolamine.

Furthermore, it is usually desirable to reject from the present system at least a portion of the gasiform material in line 10 and this may be accomplished through the valve in line 12. The gasiform material in line 12 may contain olefins which may be subjected to polymerization to form polymers boiling in the gasoline boiling range, or the $C_4$ and $C_5$ olefins may be dehydrogenated to form synthetic rubber intermediates such as butadiene and isoprene or the material in line 12 may be otherwise suitably processed to reclaim valuable products.

Now, as we have stated previously, the novelty of our invention resides in using a hydrogen sintered iron catalyst in conjunction with a larger amount of promoter than has heretofore been used. A catalyst which gives good results is a pyrites ash which has been subjected to sintering in an atmosphere of hydrogen. As is well known, pyrites, that is the ore $FeS_2$, is ordinarily subjected to roasting in the presence of air to form $SO_2$ as the first step in making sulfuric acid. The ash resulting from the roasting of the ore is a composition consisting essentially of iron oxide. It has the following typical analysis:

| | Per cent | | Per cent |
|---|---|---|---|
| Fe | 68.1 | CuO | 0.14 |
| $O_2$ | 27.5 | $SiO_2$ | 1.5 |
| S | 0.02 | $MnO_2$ | 0.18 |
| $Al_2O_3$ | 0.15 | NiO | 0.13 |
| CaO | 0.82 | ZnO | <0.25 |
| MgO | 0.8 | | |

This pyrites ash after incorporation of the promoter is then subjected to a hydrogen treatment at sintering temperatures of about 1200°–1600° F. to reduce and strengthen the catalyst.

Heretofore, the prior art recommended the use of ½ to 2 weight per cent promoter based on the total weight of catalysts of this type. These catalysts have desirably low carbonization and disintegration tendencies. However, their activity and particularly their selectivity to normally liquid products is likewise low and, more specifically, well below those of the most active and selective but strongly disintegrating non-sintered prior art iron catalysts.

It has now been found that when larger amounts of promoter are incorporated in the hydrogen-sintered catalyst, say, 3 weight per cent of added potassium carbonate based on the weight of iron catalyst, the activity and liquid product selectivity of the catalyst is greatly enhanced while the catalyst remains resistant to carbonization and physical disintegration in the synthesis process.

It will be understood, of course, that the catalyst is ground to the proper particle size for fluidizing preferably following the sintering process. A particle size and distribution of iron catalyst which may be readily fluidized is set forth in the following table:

| | Weight Percent | Distribution Actually Used |
|---|---|---|
| 0–20 | <20 | 2 |
| 20–40 | 5–30 | 6 |
| 40–80 | 10–30 | 25 |
| 80–200 | 40–80 | 67 |

In order to further explain our invention, we set forth below the results of several tests we made using varying amounts of promoter with a hydrogen sintered pyrites ash catalyst and the conditions of operation as well as the results are as follows:

*Hydrogen-sintered pyrites catalysts*

[Temp., 650° F.; feed, 2/1 $H_2$/CO; press., 250 p. s. i. g.; v./v./hr., 200.]

| Catalyst | A | B | C | |
|---|---|---|---|---|
| Percent $K_2CO_3$ Added | 1.5 | 2 | 3 | 3 |
| Sinter Temperature, °F | 1,500–1,600 | 1,600 | 1,600 | 1,600 |
| Lab. Reduction | None | None | None | 6 Hrs. at 900° F. |
| Run Hours | 184–255 | 283–306 | 297–320 | 227–250 |
| Material Bal., Wt. Percent | 83 | 93 | 77 | 97 |
| CO Conv., Percent Output | 91 | 94 | 90 | 91 |
| $C_4+$, cc./m.³ $H_2$+CO Fed | 91 | 108 | 139 | 108 |
| cc./m.³ $H_2$+CO Cons | 137 | 156 | *176 | 176 |
| Distr. Ratio, $C_4+/C_1+$ | 0.43 | 0.51 | 0.59 | 0.52 |
| Exit Gas: | | | | |
| Percent Unsats. in— | | | | |
| $C_2$ | 43 | 61 | 79 | 71 |
| $C_3$ | 73 | 87 | 87 | 88 |
| $C_4$ | 75 | 83 | 83 | 83 |
| $C_2+C_3$ | 55 | 71 | 82 | 78 |

*Calculated from $C_4+/C_1+$ distribution ratio.

Appreciable improvements in selectivity were obtained with the higher promoter content catalyst, the $C_4+$, yield increasing from 137 and 156 cc./m.³ $H_2$+CO cons. with 1.5 and 2.0% $K_2CO_3$ to 176 cc. for the 3% promoted materials. This improved selectivity with the 3% promoter concentration is also indicated by the increases in the $C_4+/C_1+$ distribution ratios and the olefin content of the exit gas hydrocarbons which has been shown to correlate with selectivity.

The foregoing data indicate that increased amounts of promoter increased selectively. We have also found that in spite of the severity of conditions and high yields of products obtained, the catalyst used in the foregoing runs was resistant to physical disintegration or fragmentation. Thus, the catalyst used in the foregoing runs or tests underwent a low rate of disintegration when the catalyst was sintered in hydrogen. An analysis of the rate of catalyst disintegration is set forth below in tabular form:

| Catalyst No. | D | B | C |
|---|---|---|---|
| $K_2CO_3$, Percent | 2 | 2 | 3 |
| $H_2$ Sinter | No | Yes | Yes |
| CAR* | 288 | 31 | 22 |
| DR** | 222 | 88 | 6 |

CAR*=Carbon Accumulation Rate. Lbs. C/100 lbs. C & O free catalyst/100 hrs.
DR**=Disintegration Rate=lbs. 0–20 mu/100 lbs. 20+mu/100 hrs. (C & O free).

It will be noted from the inspection of the catalyst from the standpoint of carbon accumulation, and catalyst disintegration rate, that where the catalyst has been sintered in the presence of hydrogen, the carbon accumulation rate on the catalyst and the rate of catalyst disintegration were very low in spite of the fact that the catalyst contained a relatively high percentage of promoter. Thus, catalyst C which contained 3% of potassium carbonate formed only 22 lbs. of carbonaceous material (carbon) per 100 lbs. of carbon and oxygen free iron catalyst per 100 hours on stream and furthermore the catalyst disintegration rate was only 6 lbs. of 0–20 mu size material formed per 100 lbs. of iron catalyst having the particle size greater than 20 mu per 100 hrs. on stream, the measurement being again on the basis of a carbon and oxygen free catalyst. It will be noted that in the case of catalyst D which is a pyrites catalyst not sintered in hydrogen, that both the rate of carbon accumulation on the catalyst and the rate of catalyst disintegration were extremely high. Consequently, the data show the improvement attainable by our novel procedure.

To give an illustration of further suitable methods for preparing catalysts in accordance with the present invention, the preparation of catalyst C is set forth below.

Fluidizable particle size, iron pyrites ash was treated with an aqueous solution containing the correct amount of potassium carbonate to impregnate the pyrites ash with 3% potassium carbonate based on the total dry catalyst. The dried composite was freed of agglomerates and then treated with nitrogen to remove air. The temperature was raised then to about 750° F. It was then treated with hydrogen and the temperature further increased to about 880° F. The temperature was then maintained at 880° to 915° F. for 16¾ hours and the hydrogen flow controlled at about 2 to 3 cubic feet per hour per pound of original charge. Following this reduction the temperature was increased to about 1600° F. and held at this level for 3½ hours still in the presence of hydrogen, during which latter period the iron was sintered. After this sintering period the sintered iron was cooled in an atmosphere of nitrogen to around 70° F. The discharged catalyst required only a relatively minor amount of grinding to restore it to a fluidizable particle size.

Instead of adding the promoter to the catalyst prior to reduction, the same may be added following the hydrogen sintering step.

To recapitulate briefly, therefore, it has been found that pyrites ash which has been sintered prior to use in the presence of an atmosphere of hydrogen, forms a catalyst which is highly resistant to fragmentation or physical disintegration during use in the hydrocarbon synthesis process and that relatively large amounts of promoter may be incorporated in the catalyst to increase its activity and selectivity, and further, that such a catalyst even under severe conditions of operation (i. e., 0.8–2.00 mols $H_2$/mol CO in total feed) is still highly resistant to fragmentation. It is indicated that the fragmentation of iron catalyst is a serious drawback in this hydrocarbon synthesis process for it results in the formation of relatively large amounts of fines (20 mu or lower sized material). During the course of a hydrocarbon synthesis operation employing the catalyst in the form of a fluidized bed such fines render it difficult, if not impossible, to maintain the catalyst in a well fluidized state.

It will be understood that the conditions prevailing in the reactor zone set forth in the above runs are illustrative and do not impose any limitation on our invention, for instance, we may operate at temperatures within the range of 600°–775° F., total pressure of from 250–800 lbs. per square inch gauge and hydrogen partial pressure of the gasiform material entering the reactor of about 125–275 lbs. per square inch gauge of the gases entering the reactor. As regards promoter, we may use from 3–10 weight per cent promoter (calculated as $K_2O$) based on the amount of iron.

What is claimed is:

1. The method of synthesizing hydrocarbons and oxygenated hydrocarbons which consists of contacting a gas containing hydrogen and carbon monoxide in synthesis proportions of from about 0.8 to 2 mols of hydrogen per mol of carbon monoxide at synthesis conditions of temperature and pressure with a fluidized mass of a catalyst prepared by first adding from about 3 to 10 weight per cent, expressed as $K_2O$, of an alkali metal compound promoter to pyrites ash of fluidizable size, then subjecting said pyrites ash to the influence of hydrogen at temperatures of from about 750° F. to about 915° F., for about 16¾ hours then further treating said pyrites ash with hydrogen at sintering temperatures of the order of 1200° to 1600° F., for about 3½ hours and thereafter cooling the sintered ash in a non-oxidizing atmosphere, continuing the contacting of the said feed gas with the thus described catalyst for a sufficient period of time to effect the desired conversion, and thereafter recovering the product from the reaction containing normally liquid hydrocarbons and oxygenated hydrocarbons.

2. The method set forth in claim 1 in which the treatment of the pyrites ash with hydrogen at temperatures within the said range of from 750° F. to 915° F. is continued for a sufficient period of time to reduce the pyrites ash substantially to the metallic state and in which the catalyst is sintered at a temperature within the range from about 1200 to 1600° F. in a hydrogen atmosphere for a sufficient period of time to render the said catalyst resistant to fragmentation in the said synthesis of hydrocarbons.

3. The method of claim 1 in which the hydrocarbon synthesis is conducted at a temperature of from about 600°–675° F. while maintaining a pressure of from about 250–800 lbs. per square inch gauge in the synthesis zone.

4. The method of claim 3 in which a hydrogen partial pressure of from about 125–175 lbs. per square inch gauge is maintained at the inlet to the synthesis zone.

References Cited in the file of this patent

UNITED STATES PATENTS

| | | |
|---|---|---|
| 2,254,806 | Michael | Sept. 2, 1941 |
| 2,476,920 | Segura | July 19, 1949 |
| 2,485,945 | Walker | Oct. 25, 1949 |
| 2,496,343 | Gillespie | Feb. 7, 1950 |
| 2,550,416 | Kimberlin | Apr. 24, 1951 |

OTHER REFERENCES

Kodama et al., Jour. Soc. Chem. Ind., Japan, vol. 44, page 154, (1941); vol. 45, page 1263–71 (1942). (See C. A. vol. 43, page 2397–98.)